United States Patent [19]

Gaddis et al.

[11] Patent Number: 5,689,958
[45] Date of Patent: Nov. 25, 1997

[54] HIGH EFFICIENCY THERMAL ELECTRIC COOLER DRIVER

[75] Inventors: Mark W. Gaddis; Peter S. Durkin; Charles E. Moeller, all of Albuquerque, N. Mex.

[73] Assignee: The United States of America as represented by the Secretary of the Air Force, Washington, D.C.

[21] Appl. No.: 721,920

[22] Filed: Sep. 27, 1996

[51] Int. Cl.⁶ ............................ F25B 21/02; H01S 3/04
[52] U.S. Cl. ........................... 62/3.7; 62/331; 372/34
[58] Field of Search .......................... 62/3.2, 3.3, 3.7, 62/259.2, 331, 132; 372/34

[56] References Cited

U.S. PATENT DOCUMENTS

| | | | |
|---|---|---|---|
| 3,031,855 | 5/1962 | Martz et al. | 62/3.7 |
| 3,967,590 | 7/1976 | Hays et al. | 122/4 R |
| 3,997,109 | 12/1976 | Hays | 237/8 R |
| 4,301,658 | 11/1981 | Reed | 62/3.7 |
| 5,029,335 | 7/1991 | Fisher et al. | 372/36 |
| 5,029,445 | 7/1991 | Higgins | 62/3.2 |
| 5,154,661 | 10/1992 | Higgins | 62/3.3 |
| 5,435,308 | 7/1995 | Gallup et al. | 128/634 |
| 5,450,727 | 9/1995 | Ramirez et al. | 62/3.7 |
| 5,603,220 | 2/1997 | Seaman | 62/3.7 |

FOREIGN PATENT DOCUMENTS

| | | | |
|---|---|---|---|
| 478204 | 4/1992 | European Pat. Off. | 62/3.7 |
| 211411 | 9/1988 | Japan | 62/3.7 |
| 405216545 | 8/1993 | Japan | 62/3.7 |

*Primary Examiner*—William Doerrler

[57] ABSTRACT

A switching thermal regulator for efficiently and accurately regulating the temperature of an attached device, which includes a constant current supply, a thermistor, a signal processing amplifier, and a switching power supply. The thermistor, which is attached to the device to be regulated, senses the temperature of the device, and signals this temperature to the constant current supply, and signals this temperature to the signal processing amplifier which, in turn, signals this temperature to the switching power supply. Based on this voltage signal, the switching power supply adjusts the output voltage sent to a cooler, which allows the device to maintain a constant temperature.

2 Claims, 3 Drawing Sheets

HIGH EFFICIENCY THERMAL ELECTRIC COOLER DRIVER

STATEMENT OF GOVERNMENT INTEREST

The invention described herein may be manufactured and used by or for the Government for governmental purposes without the payment of any royalty thereon.

BACKGROUND OF THE INVENTION

The invention relates generally to a cooling system for a device, such as a laser diode or an electric circuit. More specifically, it relates to a switching thermal regulator that efficiently regulates the temperature of a device which needs to be operated at a constant temperature.

Although the switching thermal regulator may be used to regulate the temperature of any device, it was designed for use with a portable field medical system of U.S. patent application Ser. No. 08/385,002, the disclosure of which is incorporated herein by reference. The field medical system includes a portable, battery-powered surgical laser system that is intended to cut like a scalpel, coagulate bleeding, and close wounds. As this laser system is battery-powered, its temperature needs to be regulated efficiently, and it needs a portable cooling system.

The task of cooling circuits and lasers is alleviated by the following U.S. Patents, the disclosures of which are incorporated herein by reference:

U.S. Pat. No. 3,967,590 issued to Hays et al;
U.S. Pat. No. 3,997,109 issued to Hays et al;
U.S. Pat. No. 5,029,335 issued to Fisher et al;
U.S. Pat. No. 5,435,308 issued to Gallup et al.
U.S. Pat. No. 5,154,661 issued to Higgins;
U.S. Pat. No. 5,029,445 issued to Higgins.

The first four references disclose alternative cooling devices. The two Higgins patents cool using thermal electric coolers, but are not used on electric or laser devices. The closest reference is the Fisher et al patent, which uses a heat sink in thermal contact with a diode, but a portable laser needs a battery to provide a portable cooling driver.

Prior to the invention, a linear regulator or a transistor would be used to regulate the temperature of such a circuit. Such regulation functions properly, but produces a great deal of heat, thereby wasting the battery's energy. A need remains for a highly efficient temperature regulator, and the present invention is intended to satisfy that need.

SUMMARY OF THE INVENTION

The present invention is a switching thermal regulator that efficiently regulates the temperature of an attached device. The switching thermal regulator consists of a thermistor, a constant current supply, a signal processing amplifier, and a switching power supply. The thermistor, which is attached to the device to be regulated, senses the temperature of the device. The voltage of the thermistor combines with the voltage of the constant current supply, and signals this voltage to the signal processing amplifier which, in turn, signals this temperature to the switching power supply. Based on this temperature signal, the switching power supply adjusts the output voltage sent to a cooler, which allows the device to maintain a constant temperature.

The thermistor has a constant current flowing through it that is used to set the idle temperature of the attached device. The voltage across the thermistor is fed into the signal processing amplifier, and then into the switching power supply.

The cooler may be a thermal electric cooler as described in U.S. Pat. No. 5,029,335 issued to Fisher et al, which was disclosed above.

Before the present invention, a transistor or a linear voltage regulator would be used to vary the current to the cooler. The transistor or linear voltage regulator would have a maximum efficiency of approximately 50 percent, and would produce large quantities of heat, wasting energy. In contrast, the present invention allows very little input power to be wasted as heat, enabling the invention to regulate a constant current with efficiencies as high as 92 percent.

It is an object of the present invention to efficiently control the temperature of a device by efficiently regulating the flow of current sent to a cooler that is attached to the device.

It is a further object of the invention to provide accurate temperature regulation of the attached device.

It is still a further object of the invention to reduce the required input current through efficient regulation of the attached device.

These and many other objects and advantages of the present invention will become more readily apparent to one skilled in the pertinent art from the following detailed description when taken in conjunction with the accompanying drawings wherein like elements are given like reference numerals throughout.

DETAILED DESCRIPTION OF THE PREFERRED EMBODIMENT

The switching thermal regulator of the present invention was developed to efficiently regulate the temperature of a device which has current flowing through it. In the past, transistor or linear voltage regulators have been used to regulate the current sent to the cooler. Such regulation wasted as much as 50 percent of the energy supplied to the circuit. In contrast, the switching thermal regulator allows as much as 92 percent of the supplied energy to be utilized by the attached device.

Figure 1:
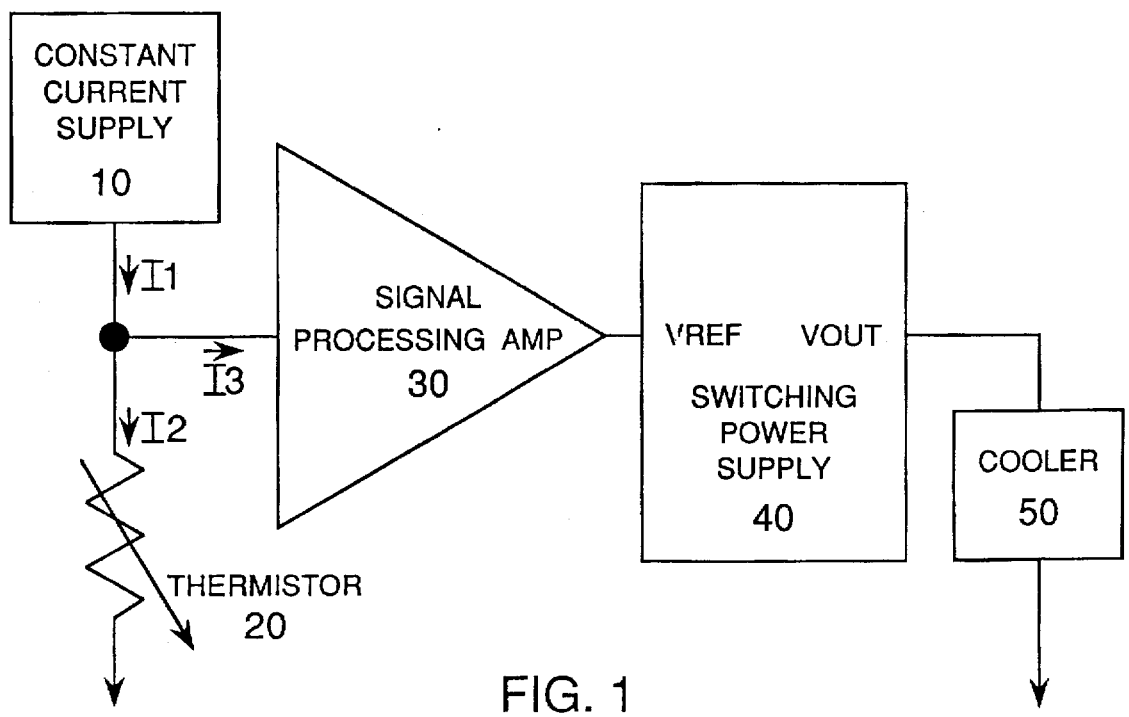
FIG. 1 is a block diagram of the present invention.

The reader's attention is now directed to FIG. 1, which is a block diagram of the switching thermal regulator of the present invention. The switching thermal regulator consists of the constant current supply 10, the thermistor 20, the signal processing amplifier 30, and the switching power supply 40. Preferably, the constant current supply consists of a 12 volt battery and a processing circuit.

The thermistor 20 has a negative temperature coefficient, so that its resistance decreases as its temperature increases, and its resistance increases and its temperature decreases. Therefore, as temperature increases, the corresponding decrease in the thermistor's resistance decreases the voltage across the thermistor 20, which sends a lower voltage to the signal processing amplifier 30.

The thermistor 20, which is attached to the device to be regulated, senses the temperature of the device. The constant current supply 10 and the thermistor 20 output a supply of electrical current as an output signal to the signal processing amplifier 30. The thermistor 20 adjusts the output signal of the constant current supply 10 with changes of temperature to produce a thermally adjusted output signal.

The signal processing amplifier 30 receives the thermally adjusted output signal from the constant current supply 10, and amplifies it to produce an amplified thermally adjusted output signal. This amplified signal is sent to the switching power supply 40. The switching power supply 40 utilizes the amplified signal that it receives to adjust the output voltage that it sends to a cooler, allowing the device to maintain a constant temperature. Specifically, the switching power supply 40 produces a driver signal that increases as the thermally adjusted output signal decreases, and decreases as the thermally adjusted output signal increases.

Figure 2:
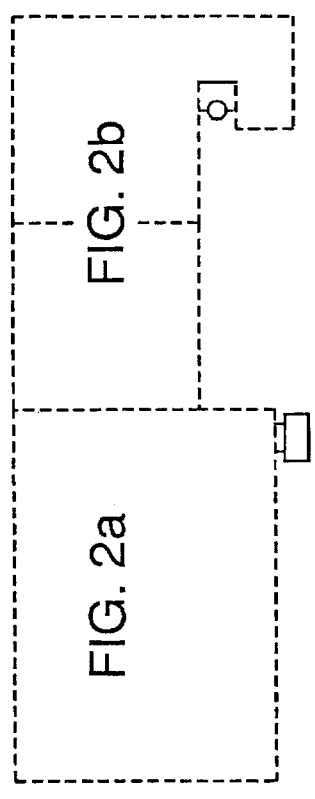
FIG. 2 is a circuit diagram of the system in FIG. 1.
Figure 2A:
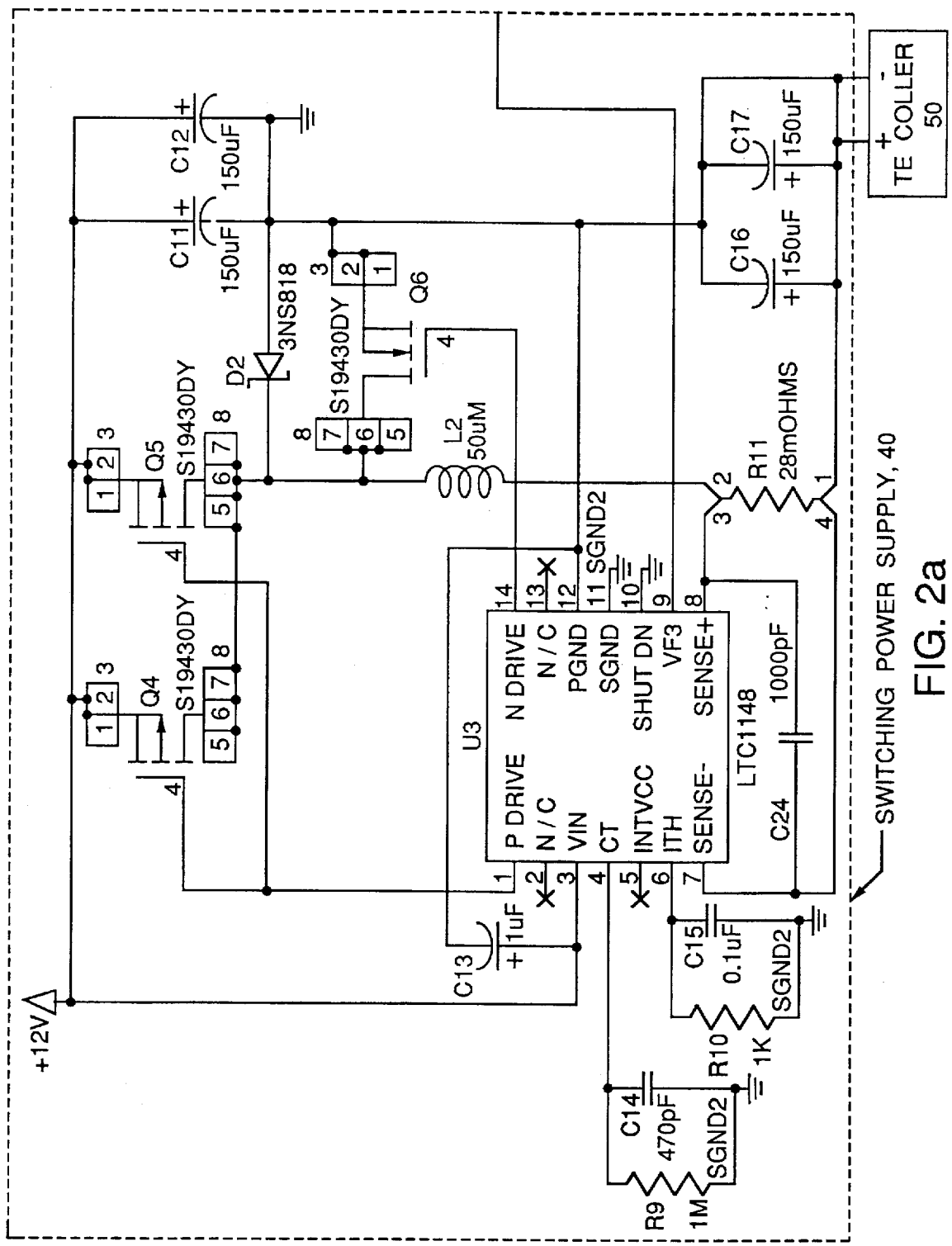
Figure 2B:
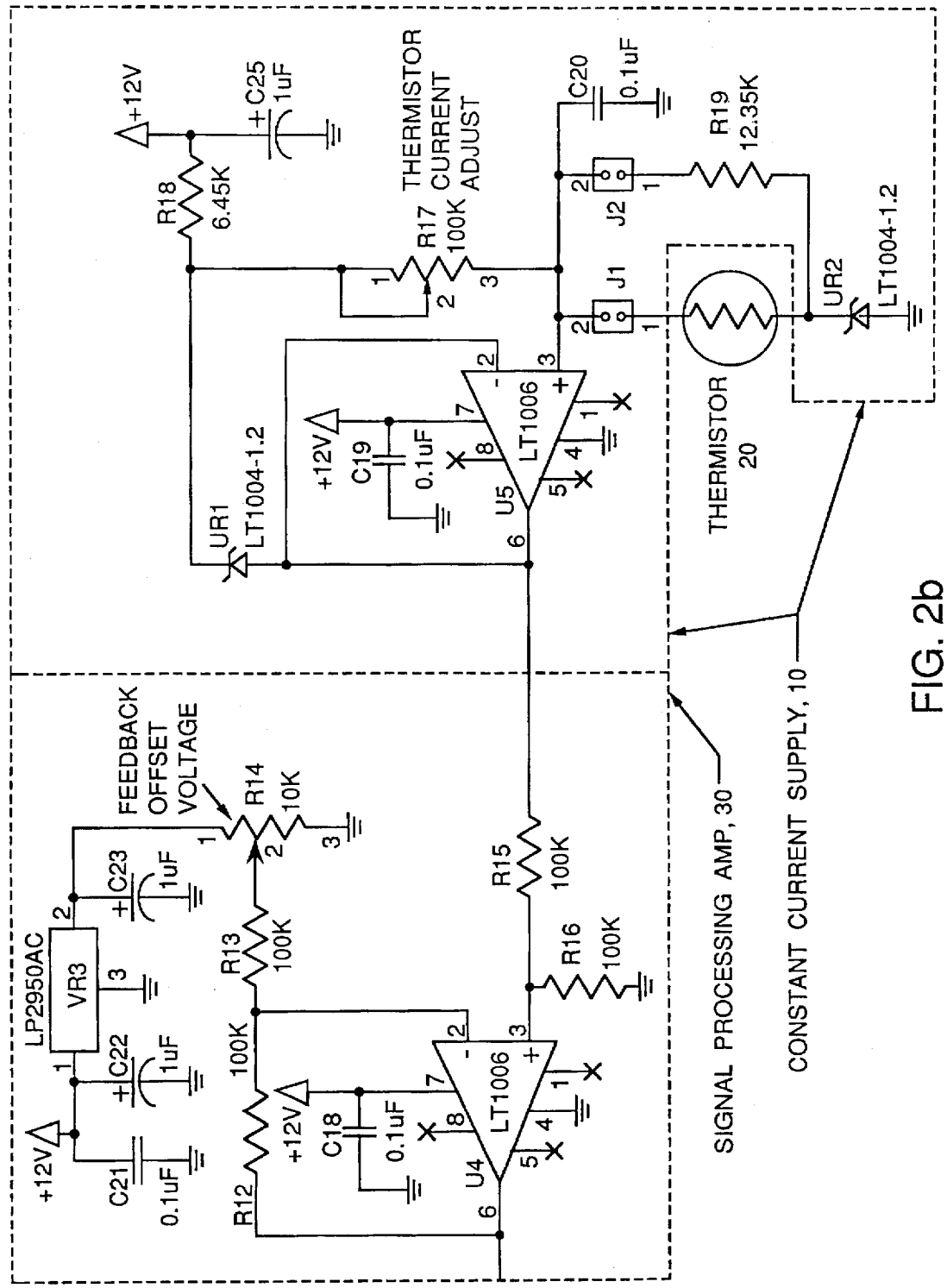

The reader's attention is now directed to FIG. 2, which is an electrical schematic of the switching thermal regulator that performs the functions of the block diagram of FIG. 1. The values of the electrical components are provided in FIG. 2, but these values may be modified for different applications.

In FIG. 2, the constant current supply 10 consists of R17, R18, R19, C19, C20, C25, VR1, VR2, U5, J1 and J2, and is attached to the thermistor 20. The signal processing amplifier 30 is made up of R12, R13, R14, R15, R16, C21, C22, C23, VR3, and U4. The switching power supply 40 consists of R9, R10, R11, C11, C12, C13, C14, C15, C16, C17, C24, U3, Q4, QS, Q6, D2 and L2. The voltage supplied is varied as needed to keep the attached device's temperature constant.

Preferably, this invention works with devices that are powered by a battery, rather than by a 120 volt alternating current source. It is particularly useful when its constant current supply 10 is derived from a direct current battery having a voltage between 3.8 volts and 16 volts. The switching thermal regulator has been used with the portable field laser system of U.S. patent application Ser. No. 08/385, 002, the disclosure of which is incorporated herein by reference. That laser system uses a 12 volt battery as its power source. The switching thermal regulator regulated the temperature of that laser system to less than 1 degree Celsius of accuracy while providing the necessary driving power to a cooler with a power efficiency level as high as 92 percent.

The switching thermal regulator's ability to reduce the required input current needed to regulate an attached device's temperature while simultaneously reducing its wasted heat loss makes it a unique solution for cooling a device.

The above-cited Fisher et al reference uses a thermal electric cooler to regulate the temperature of a laser diode, but the surgical laser that uses the present invention is a portable system that needs a high efficiency, portable temperature regulation system. The present invention is intended to satisfy that need.

While the invention has been described in its presently preferred embodiment, it is understood that the words which have been used are words of description rather than words of limitation, and that changes within the purview of the appended claims may be made without departing from the scope and spirit of the invention in its broader aspects.

What is claimed is:

1. A portable switching thermal regulator which regulates the temperature of an attached portable field medical laser and comprising:

a portable current supply which produces a driver signal wherein said current supply has a power source providing a constant current supply using a direct current battery and a processing circuit, wherein said power source has a voltage of between 3.8 volts and 16 volts;

a circuit for supplying current;

a thermistor which adjusts said output signal of said constant current supply with changes of temperature to produce a thermally adjusted output signal;

a signal processing amplifier which receives and amplifies said thermally adjusted output signal to produce an amplified thermally adjusted output signal;

a switching power supply which receives said amplified thermally adjusted output signal, produces an output driver signal that increases as said amplified thermally adjusted output signal decreases and decreases as said amplified thermally adjusted output signal increases, and communicates said output driver signal to a cooler; and a means for communicating said output signal to a cooler.

2. A portable switching thermal regulator as described in claim 1, wherein said cooler is a thermal electric cooler, which is driven by said amplified thermally adjusted output signal of said signal processing amplifier, is fixed in thermal contact with said attached portable field medical laser, and cools said attached portable field medical laser in response to said output signal of said producing means.

* * * * *

UNITED STATES PATENT AND TRADEMARK OFFICE
CERTIFICATE OF CORRECTION

PATENT NO. : 5,689,958

DATED : 25 November 1997

INVENTOR(S) : Mark W. Gaddis et al.

It is certified that error appears in the above-identified patent and that said Letters Patent is hereby corrected as shown below:

On title page, the following should be added:

--Attorney, Agent, or Firm-William G. Auton--.

Signed and Sealed this

Twenty-fourth Day of February, 1998

*Attest:*

BRUCE LEHMAN

*Attesting Officer*     *Commissioner of Patents and Trademarks*